United States Patent
Song et al.

(10) Patent No.: US 8,128,840 B2
(45) Date of Patent: Mar. 6, 2012

(54) PHOSPHOR COMPOSITION FOR DISPLAY DEVICE

(75) Inventors: Jay-Hyok Song, Suwon-si (KR); Yu-Mi Song, Suwon-si (KR); Yoon-Chang Kim, Suwon-si (KR); Do-Hyung Park, Suwon-si (KR); Yong-Chan You, Suwon-si (KR); Gyeong-Jae Heo, Suwon-si (KR); Ick-Kyu Choi, Suwon-si (KR); Mi-Ran Song, Suwon-si (KR); Seon-Young Kwon, Suwon-si (KR); Hyun-Deok Lee, Suwon-si (KR); Ji-Hyun Kim, Suwon-si (KR); Jin-Hyoung Seo, Suwon-si (KR); Sun-Hwa Kwon, Suwon-si (KR); Ji-Hyun Kim, Suwon-si (KR); Min-Ju Kim, Suwon-si (KR); Young-Hun Lee, Suwon-si (KR); Young-Ki Kim, Suwon-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 493 days.

(21) Appl. No.: 12/320,553

(22) Filed: Jan. 29, 2009

(65) Prior Publication Data

US 2009/0195142 A1    Aug. 6, 2009

(30) Foreign Application Priority Data

Feb. 1, 2008 (KR) .................. 10-2008-0010678

(51) Int. Cl.
*C09K 11/80* (2006.01)

(52) U.S. Cl. .... 252/301.4 R; 252/301.6 F; 252/301.6 R; 313/486; 313/487; 313/582; 313/584

(58) Field of Classification Search ........... 252/301.4 R, 252/301.6 R, 301.6 F; 313/486, 487
See application file for complete search history.

(56) References Cited

U.S. PATENT DOCUMENTS

| | | | | | |
|---|---|---|---|---|---|
| 4,550,256 | A | * | 10/1985 | Berkstresser et al. | 250/483.1 |
| 6,717,349 | B2 | * | 4/2004 | Wang et al. | 313/483 |
| 2006/0145593 | A1 | * | 7/2006 | Yoshino et al. | 313/487 |
| 2008/0067919 | A1 | * | 3/2008 | Wang et al. | 313/503 |
| 2009/0008663 | A1 | * | 1/2009 | Shimizu et al. | 257/98 |

FOREIGN PATENT DOCUMENTS

| | | | |
|---|---|---|---|
| CN | 101104804 | * | 1/2008 |
| JP | 1-108295 | * | 4/1989 |
| JP | 2002-363555 A | | 12/2002 |
| KR | 10-0627349 B1 | | 9/2006 |
| WO | WO 2006/093015 | * | 9/2006 |

OTHER PUBLICATIONS

Derwent abstract 2008-L87165: CN 101134896, Mar. 2008.*

* cited by examiner

*Primary Examiner* — Carol M Koslow
(74) *Attorney, Agent, or Firm* — Lee & Morse, P.C.

(57) ABSTRACT

A phosphor composition for a display device, including a phosphor represented by Formula 1:

$$Y_{3-x-k-z}Ce_kM_zM'_xAl_{a-y}M''_yO_{(1.5a+4.5)} \quad (1).$$

In Formula 1, M includes at least one of Tb, Dy, and Eu, M' includes at least one of Sc, Gd, In, and La, M'' includes at least one of Ga, Sc, and In, and x, y, z, k, and a represent molar ratios and satisfy the relations: $0.0 \leq x < 3.0$, $0.0 \leq y \leq 7.0$, $0.0 < k < 0.1$, $0.0 < z < 0.5$, $4.0 \leq a \leq 7.0$, $a-y \geq 0.0$, $x+k+z \leq 3.0$, and $0.01 \leq z/k \leq 20$.

13 Claims, 5 Drawing Sheets

Table 1: Color coordinates, brightness, and decay times for Examples 1-6 and Comparative Examples 1 and 2.

| | Phosphor composition | CIE x | CIE y | Decay time |
|---|---|---|---|---|
| Example 1 | $Y_{2.96}Ce_{0.03}Tb_{0.01}Al_5O_{12}$ (z=0.01) | 0.4076 | 0.5467 | < 1.0 ms |
| Example 2 | $Y_{2.92}Ce_{0.03}Tb_{0.05}Al_5O_{12}$ (z=0.05) | 0.4042 | 0.5472 | < 1.0 ms |
| Example 3 | $Y_{2.87}Ce_{0.03}Tb_{0.10}Al_5O_{12}$ (z=0.10) | 0.4100 | 0.5510 | 1.0 ± 0.2 ms |
| Example 4 | $Y_{2.82}Ce_{0.03}Tb_{0.15}Al_5O_{12}$ (z=0.15) | 0.4144 | 0.5498 | 1.1 ± 0.2 ms |
| Example 5 | $Y_{2.77}Ce_{0.03}Tb_{0.20}Al_5O_{12}$ (z=0.20) | 0.4163 | 0.5484 | 1.2 ± 0.2 ms |
| Example 6 | $Y_{2.67}Ce_{0.03}Tb_{0.30}Al_5O_{12}$ (z=0.30) | 0.4172 | 0.5478 | 1.6 ± 0.2 ms |
| Comparative Example 1 | $Y_{2.97}Ce_{0.03}Al_5O_{12}$ | 0.4127 | 0.5521 | < 1.0 ms |
| Comparative Example 2 | $Y_{2.47}Ce_{0.03}Tb_{0.50}Al_5O_{12}$ (z=0.50) | 0.3928 | 0.5430 | 4.1 ± 0.2 ms |

Table 1: Color coordinates, brightness, and decay times for Examples 1-6 and Comparative Examples 1 and 2.

| | Phosphor composition | CIE x | CIE y | Decay time |
|---|---|---|---|---|
| Example 1 | $Y_{2.96}Ce_{0.03}Tb_{0.01}Al_5O_{12}$ (z=0.01) | 0.4076 | 0.5467 | < 1.0 ms |
| Example 2 | $Y_{2.92}Ce_{0.03}Tb_{0.05}Al_5O_{12}$ (z=0.05) | 0.4042 | 0.5472 | < 1.0 ms |
| Example 3 | $Y_{2.87}Ce_{0.03}Tb_{0.10}Al_5O_{12}$ (z=0.10) | 0.4100 | 0.5510 | 1.0 ± 0.2 ms |
| Example 4 | $Y_{2.82}Ce_{0.03}Tb_{0.15}Al_5O_{12}$ (z=0.15) | 0.4144 | 0.5498 | 1.1 ± 0.2 ms |
| Example 5 | $Y_{2.77}Ce_{0.03}Tb_{0.20}Al_5O_{12}$ (z=0.20) | 0.4163 | 0.5484 | 1.2 ± 0.2 ms |
| Example 6 | $Y_{2.67}Ce_{0.03}Tb_{0.30}Al_5O_{12}$ (z=0.30) | 0.4172 | 0.5478 | 1.6 ± 0.2 ms |
| Comparative Example 1 | $Y_{2.97}Ce_{0.03}Al_5O_{12}$ | 0.4127 | 0.5521 | < 1.0 ms |
| Comparative Example 2 | $Y_{2.47}Ce_{0.03}Tb_{0.50}Al_5O_{12}$ (z=0.50) | 0.3928 | 0.5430 | 4.1 ± 0.2 ms |

FIG. 4

Table 2: Decay times, color coordinates, and brightness for Example 7

| Mixing weight ratio | Decay time (msec) | CIE x | CIE y | Relative brightness (%) |
|---|---|---|---|---|
| R1 : R2 = 10.0 : 0.0 | 1.0 ± 0.2 | 0.4100 | 0.5510 | 100.0 |
| R1 : R2 = 75 : 25 | 2.8 ± 0.2 | 0.3605 | 0.6007 | 106.0 |
| R1 : R2 = 50 : 50 | 4.5 ± 0.2 | 0.3078 | 0.6477 | 113.3 |
| R1 : R2 = 25 : 75 | 4.9 ± 0.2 | 0.2833 | 0.6693 | 120.6 |
| R1 : R2 = 0.0 : 10.0 | 5.5 ± 0.2 | 0.2617 | 0.6921 | 130.4 |

FIG. 5

Table 3: Decay times, color coordinates, and brightness for Example 8

| Mixing weight ratio | Decay time (msec) | CIE x | CIE y | Relative brightness (%) |
|---|---|---|---|---|
| R1 : R2 = 10.0 : 0.0 | 1.0 ± 0.2 | 0.4100 | 0.5510 | 100.0 |
| R1 : R2 = 75 : 25 | 1.8 ± 0.2 | 0.3956 | 0.5635 | 108.1 |
| R1 : R2 = 50 : 50 | 2.5 ± 0.2 | 0.3752 | 0.5726 | 116.2 |
| R1 : R2 = 25 : 75 | 3.8 ± 0.2 | 0.3502 | 0.5792 | 127.2 |
| R1 : R2 = 0.0 : 10.0 | 5.0 ± 0.2 | 0.3383 | 0.5844 | 139.5 |

PHOSPHOR COMPOSITION FOR DISPLAY DEVICE

BACKGROUND

1. Field of the Invention

Embodiments relate to a phosphor composition for a display device. More particularly, embodiments relate to a phosphor composition for a display device having good brightness and color coordinate characteristics when realizing a stereoscopic image.

2. Description of the Related Art

A stereoscopic image from a plasma display panel (PDP) may be realized by dividing 1 TV field (16.7 ms) into two subfields, respectively producing left and right stereoscopic images, and then projecting the stereoscopic images to left and right eyes of a user wearing goggles. Optical shutters may be mounted on the left and right sides of the goggles to project the selected stereoscopic image signal to both eyes of the user by connecting the left subfield and the right subfield.

The phosphor layers in the PDP for a stereoscopic image should have a lower decay time than that of a general PDP, because the conventional 1 TV field is divided in half to provide two subfields. Particularly, phosphors having a decay time of more than 4.0 ms may cause a crosstalk phenomenon, e.g., acquiring a left subfield image by the right eye, thereby remarkably deteriorating the resolution and distinction of a stereoscopic image.

A decay time of 5 ms or less may be required for a three dimensional ("3D") PDP. In addition, when the PDP panel is used for a long time, a severe decrease in brightness may occur relative to the red and blue phosphors. Accordingly, a green phosphor having a short decay time may be required in order to realize a stereoscopic image.

SUMMARY

Embodiments are therefore directed to a phosphor composition for a display device, which substantially overcome one or more of the problems due to the limitations and disadvantages of the prior art.

It is therefore a feature of an embodiment to provide a phosphor composition for a green discharge cell having a low decay time.

It is therefore another feature of an embodiment to provide a phosphor composition having excellent color quality characteristics.

It is therefore another feature of an embodiment to provide a phosphor composition having excellent brightness.

At least one of the above and other features and advantages may be realized by providing a phosphor composition for a display device including a phosphor represented by Formula 1:

$$Y_{3-x-k-z}Ce_kM_zM'_xAl_{a-y}M''_yO_{(1.5a+4.5)} \quad (1).$$

In Formula 1, M may include at least one of Tb, Dy, and Eu, M' may include at least one of Sc, Gd, In, and La, M" may include at least one of Ga, Sc, and In, and x, y, z, k, and a may represent molar ratios and satisfy the relations: $0.0 \leq x < 3.0$, $0.0 \leq y \leq 7.0$, $0.0 < k < 0.1$, $0.0 < z < 0.5$, $4.0 \leq a \leq 7.0$, $a-y \geq 0.0$, $x+k+z \leq 3.0$, and $0.01 \leq z/k \leq 20$.

In Formula 1, z may satisfy the relation: $0.0 < z < 0.2$.

The phosphor may have a CIE x color coordinate of about 0.38 to about 0.42 and a CIE y color coordinate of about 0.53 to about 0.56.

The phosphor composition may further include a second phosphor including at least one phosphor represented by the following Formulae 2 to 9:

$$Zn_{2-p}Mn_pSiO_4 \quad (2)$$

wherein p satisfies the relation: $0.01 \leq p \leq 0.60$, $$YBO_3:Tb \quad (3)$$

$$(Y,Gd)_{1-q}Tb_qAl_3(BO_3)_4 \quad (4)$$

wherein q satisfies the relation: $0.01 \leq q < 0.50$, $$BaMgAl_{12}O_{17}:Mn \quad (5)$$

$$BaMgAl_{12}O_{19}:Mn \quad (6)$$

$$Zn(Ga_{1-r}Al_r)_2O_4:Mn \quad (7)$$

wherein r satisfies the relation: $0 \leq r \leq 1$, $$Li_2Zn(Ge,\theta)_vO_8:Mn \quad (8)$$

wherein θ includes Al or Ga, and v satisfies the relation: $3 \leq v \leq 4$, $$(Y_{3-w}Ce_w)Al_5O_{12} \quad (9)$$

wherein w satisfies the relation: $0 \leq w \leq 3$.

A weight ratio of the first phosphor and the second phosphor may be about 90:10 to about 30:70.

At least one of the above and other features and advantages may also be realized by providing a display device, including a display unit that includes a phosphor composition including a phosphor represented by Formula 1:

$$Y_{3-x-k-z}Ce_kM_zM'_xAl_{a-y}M''_yO_{(1.5a+4.5)}$$

wherein, M may include at least one of Tb, Dy, and Eu, M' may include at least one of Sc, Gd, In, and La, M" may include at least one of Ga, Sc, and In, x, y, z, k, and a may represent molar ratios and satisfy the relations: $0.0 \leq x < 3.0$, $0.0 \leq y \leq 7.0$, $0.0 < k < 0.1$, $0.0 < z < 0.5$, $4.0 \leq a \leq 7.0$, $a-y \geq 0.0$, $x+k+z \leq 3.0$, and $0.01 \leq z/k \leq 20$.

In Formula 1, z may satisfy the relation: $0.0 < z < 0.2$.

The phosphor of Formula 1 may have a decay time of about 5.0 ms or less.

The phosphor may have a CIE x color coordinate of about 0.38 to about 0.42 and a CIE y color coordinate of about 0.53 to about 0.56.

The phosphor composition may further include a second phosphor including at least one phosphor represented by the following Formulae 2 to 9:

$$Zn_{2-p}Mn_pSiO_4 \quad (2)$$

wherein p satisfies the relation: $0.01 \leq p \leq 0.60$, $$YBO_3:Tb \quad (3)$$

$$(Y,Gd)_{1-q}Tb_qAl_3(BO_3)_4 \quad (4)$$

wherein q satisfies the relation: $0.01 \leq q < 0.50$, $$BaMgAl_{10}O_{17}:Mn \quad (5)$$

$$BaMgAl_{12}O_{19}:Mn \quad (6)$$

$$Zn(Ga_{1-r}Al_r)_2O_4:Mn \quad (7)$$

wherein r satisfies the relation: $0 \leq r \leq 1$, $$Li_2Zn(Ge,\theta)_vO_8:Mn \quad (8)$$

wherein θ includes Al or Ga, and v satisfies the relation: $3 \leq v \leq 4$, $$(Y_{3-w}Ce_w)Al_5O_{12} \quad (9)$$

wherein w satisfies the relation: $0 \leq w \leq 3$.

A weight ratio of the first phosphor and the second phosphor may be about 90:10 to about 30:70.

The display device may include a device for realizing a three-dimensional stereoscopic image.

The display device may be driven at speed of about 120 Hz or more.

BRIEF DESCRIPTION OF THE DRAWINGS

The above and other features and advantages will become more apparent to those of ordinary skill in the art by describing in detail exemplary embodiments thereof with reference to the attached drawings, in which.

DETAILED DESCRIPTION

Korean Patent Application No. 10-2008-0010678, filed on Feb. 1, 2008, in the Korean Intellectual Property Office, and entitled: "Phosphor Composition for Display Device," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

As used herein, the expressions "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C" and "A, B, and/or C" includes the following meanings: A alone; B alone; C alone; both A and B together; both A and C together; both B and C together; and all three of A, B, and C together. Further, these expressions are open-ended, unless expressly designated to the contrary by their combination with the term "consisting of." For example, the expression "at least one of A, B, and C" may also include an $n^{th}$ member, where n is greater than 3, whereas the expression "at least one selected from the group consisting of A, B, and C" does not.

As used herein, the expression "or" is not an "exclusive or" unless it is used in conjunction with the term "either." For example, the expression "A, B, or C" includes A alone; B alone; C alone; both A and B together; both A and C together; both B and C together; and all three of A, B, and C together, whereas the expression "either A, B, or C" means one of A alone, B alone, and C alone, and does not mean any of both A and B together; both A and C together; both B and C together; and all three of A, B, and C together.

As used herein, the terms "a" and "an" are open terms that may be used in conjunction with singular items or with plural items. For example, the term "a co-dopant" may represent a single compound, e.g., dysprosium, or multiple compounds in combination, e.g., dysprosium mixed with terbium.

As used herein, the term "decay time" means the time for decreasing optical volume expressed from a phosphor to 1/10 of the initial optical volume.

Embodiments relate to a phosphor composition for a display device, and particularly, for a display device that is capable of realizing a three-dimensional stereoscopic image. Specifically, embodiments relate to a green phosphor composition that exhibits a shorter decay time than red and blue phosphors, because green may have high brightness and a wavelength that may be more easily detected by human eyes. The display device of an embodiment may be used in any suitable display device, e.g., a plasma display panel (PDP), etc., able to realize a three-dimensional stereoscopic image. According to another embodiment, the phosphor composition may be used in a plasma display device having an excitation source of vacuum ultraviolet (VUV) rays.

The display device should include a phosphor having a short decay time in order to realize a three-dimensional stereoscopic image. Among the colors of phosphors commonly used in display devices, red, green, and blue, the green phosphor may be the easiest to be detected by unaided eyes. In order to realize a three-dimensional stereoscopic image, to the conventional plasma display, $Y_3Al_5O_{12}$:Ce (YAG:Ce) may be added to the green phosphor composition, which has a relative short decay time. This is because the conventional green phosphor has a long decay time, ranging from 6 to 17 ms. However, the $Y_3Al_5O_{12}$:Ce may have inferior color coordinate and brightness characteristics when compared to those of the conventional green phosphor for a PDP. The green brightness characteristics of the 3D PDP using $Y_3Al_5O_{12}$:Ce may be lower compared to those of a general PDP.

According to an embodiment, it may be possible to improve brightness and color coordinate characteristics while maintaining a low decay time by adding a co-dopant, e.g., Tb, to $Y_3Al_5O_{12}$:Ce, when preparing a phosphor composition for a display device having an excitation source of VUV rays.

The phosphor composition for a display device according to an embodiment may include a phosphor represented by the following Formula 1:

$$Y_{3-x-k-z}Ce_kM_zM'_xAl_{a-y}M''_yO_{(1.5a+4.5)} \quad (1)$$

In Formula 1, M may be a co-dopant including at least one of Tb, Dy, and Eu. In a preferred embodiment, M is Tb.

M' may include at least one of Sc, Gd, In, and La. In a preferred embodiment, M' is Gd and/or La.

M" may include at least one of Ga, Sc, and In. In a preferred embodiment, M" is Ga.

x, y, k, z, and a may represent molar ratios of the elements of the phosphor. x, y, k, z, and a may satisfy the relations: $0.0 \leq x < 3.0$; $0.0 \leq y \leq 7.0$; $0.0 < k < 0.1$; $0.0 < z < 0.5$; $4.0 \leq a \leq 7.0$; $a-y \geq 0.0$; $x+k+z \leq 3.0$; and $0.01 \leq z/k \leq 20$.

In a preferred embodiment, x, y, k, z, and a satisfy the relations: $0.0 \leq x \leq 1.0$; $0.0 \leq y \leq 2.0$; $0.01 < k < 0.05$; $0.0 < z < 0.2$;

$5.0 \leq a \leq 6.0$; and $0.3 \leq z/k \leq 6$, which may provide a phosphor with short decay time and good brightness.

The phosphor composition according to an embodiment may include a first phosphor represented by Formula 1, and further include a second phosphor including at least one phosphor represented by the following Formulae 2 to 9. In addition, the second phosphor may include any suitable green phosphors, other than phosphors represented by the following Formulae 2 to 9, as long as they can maintain brightness characteristics and improve green color coordinate characteristics. The other green phosphors may be used together with phosphors represented by the following Formulae 2 to 9.

$$Zn_{2-p}Mn_pSiO_4 \quad (2)$$

In Formula 2, p may satisfy the relation: $0.01 \leq p \leq 0.60$.

$$YBO_3:Tb \quad (3)$$

$$(Y,Gd)_{1-q}Tb_qAl_3(BO_3)_4 \quad (4)$$

In Formula 4, q may satisfy the relation: $0.01 \leq q \leq 0.50$.

$$BaMgAl_{10}O_{17}:Mn \quad (5)$$

$$BaMgAl_{12}O_{19}:Mn \quad (6)$$

$$Zn(Ga_{1-r}Al_r)_2O_4:Mn \quad (7)$$

In Formula 7, r may satisfy the relation: $0 \leq r \leq 1$.

$$Li_2Zn(Ge,\theta)_vO_8:Mn \quad (8)$$

In Formula 8, θ may include Al or Ga, and v may satisfy the relation: $3 \leq v \leq 4$.

$$(Y_{3-w}Ce_w)Al_5O_{12} \quad (9)$$

In Formula 9, w may satisfy the relation: $0 \leq w \leq 3$.

According to an embodiment, a weight ratio of the first phosphor and the second phosphor may be about 90:10 to about 30:70. Preferably, the weight ratio of the first phosphor and the second phosphor is about 80:20 to about 40:60, which may help ensure improved green color coordinate characteristics while maintaining brightness characteristics, improving overall color quality.

The phosphor composition according to an embodiment may have excellent brightness and color coordinate characteristics, as well as a short decay time, so that it may be used in a display device such as a PDP. Particularly, such a phosphor composition may be used in a display device that is capable of driving at a high speed of, e.g., about 120 Hz or higher, or in a device for displaying a three-dimensional stereoscopic image.

The phosphor represented by Formula 1 may have a short decay time, e.g., of about 5 ms or less. Preferably, the decay time is about 2.0 ms or less. The phosphor composition, including phosphors represented by Formula 1, may have a decay time of about 5 ms or less. Preferably, the decay time is about 1.5 ms or less, so that the phosphor composition may be used in a device for displaying a three-dimensional stereoscopic image.

The phosphor represented by Formula 1 may have color coordinates CIE x of about 0.38 to about 0.42 and CIE y of about 0.53 to about 0.56, which may indicate an excellent green color coordinate characteristic. The phosphor composition, including the phosphor represented by Formula 1, may have a color coordinate CIE x of about 0.28 to about 0.37 and CIE y of about 0.55 to about 0.68, which may also indicate an excellent green color coordinate characteristic.

A display device including the phosphor composition according to an embodiment is described below. The display device may have an excitation source of vacuum ultraviolet (VUV) rays, e.g., a PDP, etc. The phosphor composition according to an embodiment may be used in a display device that is capable of driving at a high speed of, e.g., about 120 Hz or higher, or a device for displaying a three-dimensional stereoscopic image.

Figure 1:
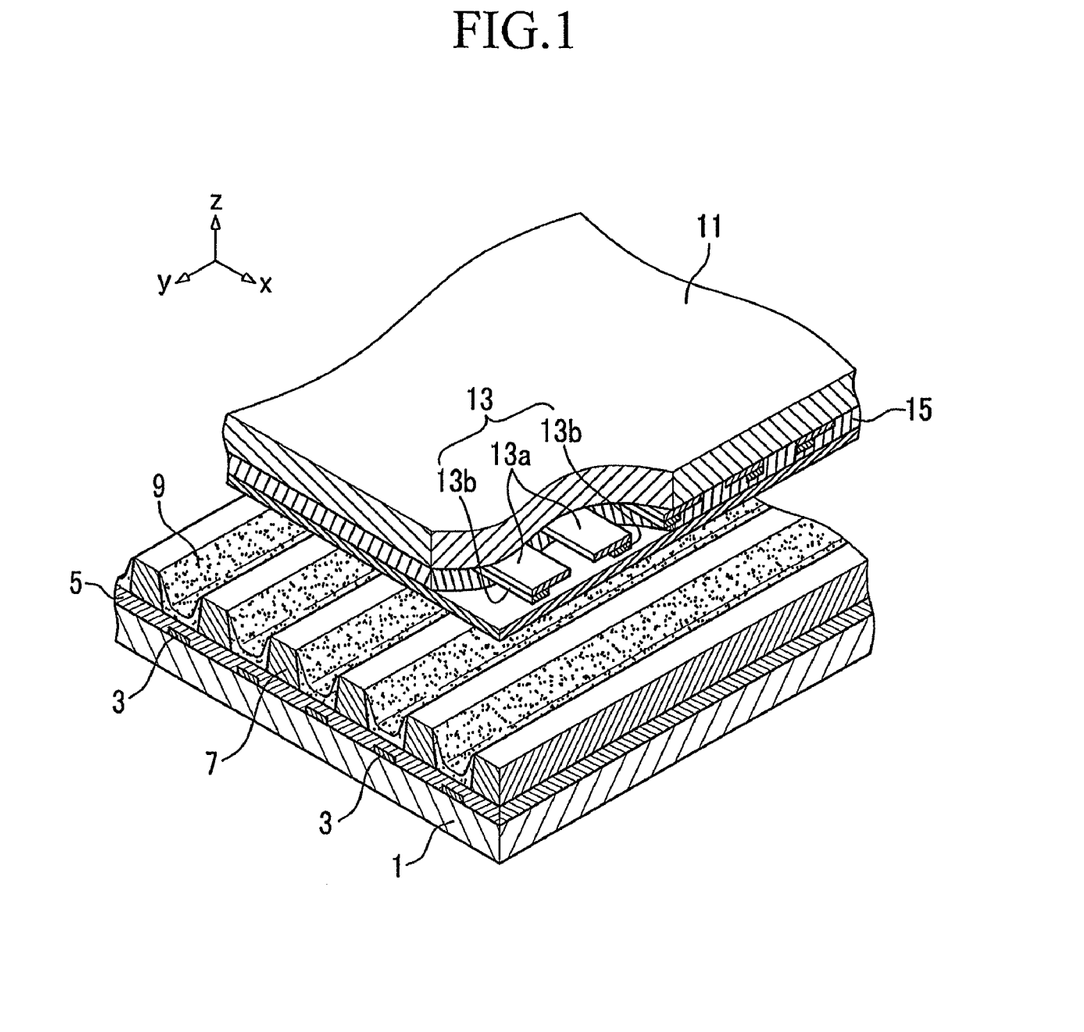
FIG. 1 illustrates a partial exploded perspective view of a plasma display panel according to an embodiment.

Hereinafter, a PDP is described as an example of a display device. FIG. 1 illustrates a partial exploded perspective view of a PDP according to an embodiment.

As shown in FIG. 1, the PDP may include a first substrate 1 (rear substrate) and a second substrate 11 (front substrate) disposed substantially in parallel with each other, with a predetermined distance therebetween.

On the surface of the first substrate 1, a plurality of address electrodes 3 may be disposed in one direction (the Y direction in the drawing), and a first dielectric layer 5 may be disposed covering the address electrodes 3. A plurality of barrier ribs 7 may be formed on the first dielectric layer 5 between the address electrodes 3 at a predetermined height to form a discharge space.

The barrier ribs 7 may be formed in any suitable shape as long as the barrier ribs 7 partition the discharge space. The barrier ribs 7 may have diverse patterns. For example, the barrier ribs 7 may be formed as an open-type, e.g., a stripe, or as a closed type, e.g., a waffle, a matrix, or a delta shape. Also, the closed-type barrier ribs may be formed such that a horizontal cross-section of the discharge space may be a polygon, e.g., a quadrangle, a triangle, or a pentagon, or a circle or an oval. Red (R), green (G), and blue (B) phosphor layers 9 may be disposed in discharge cells formed between the barrier ribs 7.

Display electrodes 13, each including a transparent electrode 13a and a bus electrode 13b, may be disposed in a direction crossing the address electrodes 3 (X direction in the drawing) on one surface of the second substrate 11 facing the first substrate 1. Also, a dielectric layer 15 may be disposed on the surface of the second substrate 11 while covering the display electrodes 13.

Discharge cells may be formed at positions where the address electrodes 3 of the first substrate 1 cross the display electrodes 13 of the second substrate 11. The discharge cells may be filled with a discharge gas.

With the above-described structure, address discharge may be achieved by applying an address voltage (Va) to a space between the address electrodes 3 and any one display electrode 13. When a sustain voltage (Vs) is applied to a space between a pair of display electrodes 13, an excitation source generated from the sustain discharge may excite a corresponding phosphor layer 9 to thereby emit visible light through the transparent second substrate 11. The excitation source may include VUV rays.

The following examples illustrate embodiments in more detail. The following examples are not more than specific examples of the embodiments, and the scope of the present invention is not limited by the examples.

EXAMPLE 1

$Y_2O_3$, $CeO_2$, $Al_2O_3$, and $Tb_4O_7$ as raw materials were weighed and mixed in accordance with a chemical equivalent. 0.5 wt % of $BaF_2$ was then added to provide a mixture. 100 g of the obtained mixture was introduced into a 300 cc alumina crucible and fired at 1400° C. for 2.5 hours. During the firing process, 15 g of carbon was added to maintain a reduction atmosphere. The fired mixture was pulverized, washed, dried, and sieved to provide a $Y_{2.96}Ce_{0.03}Tb_{0.01}Al_5O_{12}$ phosphor.

EXAMPLE 2

A $Y_{2.92}Ce_{0.03}Tb_{0.05}Al_5O_{12}$ phosphor was obtained in accordance with the same procedure as in Example 1, except that the amounts of the raw materials used were changed in accordance with a chemical equivalent.

EXAMPLE 3

A $Y_{2.87}Ce_{0.03}Tb_{0.10}Al_5O_{12}$ phosphor was obtained in accordance with the same procedure as in Example 1, except the amounts of the raw materials used were changed in accordance with a chemical equivalent.

EXAMPLE 4

A $Y_{2.82}Ce_{0.03}Tb_{0.15}Al_5O_{12}$ phosphor was obtained in accordance with the same procedure as in Example 1, except that the amounts of the raw materials used were changed in accordance with a chemical equivalent.

EXAMPLE 5

A $Y_{2.77}Ce_{0.03}Tb_{0.20}Al_5O_{12}$ phosphor was obtained in accordance with the same procedure as in Example 1, except that the amounts of the raw materials used were changed in accordance with a chemical equivalent.

EXAMPLE 6

A $Y_{2.67}Ce_{0.03}Tb_{0.30}Al_5O_{12}$ phosphor was obtained in accordance with the same procedure as in Example 1, except that the amounts of the raw materials used were changed in accordance with a chemical equivalent.

COMPARATIVE EXAMPLE 1

$Y_2O_3$, $CeO_2$, and $Al_2O_3$ as raw materials were weighed and mixed in accordance with a chemical equivalent. 0.5 wt % of $BaF_2$ was then added to provide a mixture. 100 g of the obtained mixture was introduced into a 300 cc alumina crucible and fired at 1400° C. for 2.5 hours. During the firing process, 15 g of carbon was added to maintain a reduction atmosphere. The fired mixture was pulverized, washed, dried, and sieved to provide a $Y_{2.97}Ce_{0.03}Al_5O_{12}$ phosphor.

COMPARATIVE EXAMPLE 2

A $Y_{2.47}Ce_{0.03}Tb_{0.50}Al_5O_{12}$ phosphor was obtained in accordance with the same procedure as in Example 1, except that the amounts of the raw materials used were changed in accordance with a chemical equivalent.

Phosphors obtained from Examples 1 to 6 and Comparative Examples 1 and 2 were measured for color coordinate (CIE x, y), relative brightness, and decay time. The results are shown in Table 1.

The CIE color coordinates for the green phosphors were evaluated. An ideal value for x is about 0.3, and an ideal value for y is about 0.6. The measured color coordinate values were compared with reference values.

The relative brightness was determined as the relative value to that of $Y_{2.97}Ce_{0.03}Al_5O_{12}$, prepared according to Comparative Example 1. The relative brightness of $Y_{2.97}Ce_{0.03}Al_5O_{12}$ was considered to be 100%.

The decay time was also measured. The "±0.2" in Table 1 represents a measurement error in the decay time.

As shown in Table 1, the green phosphors according to Examples 1 to 6 and Comparative Example 1 showed a decay time of about 1.5 ms or less. However, green phosphors according to Examples 1 to 6 in which Ce and Tb were doped in yttrium aluminum garnet (YAG) also had excellent brightness characteristics, superior to that of Comparative Example 1. This may be because the doped rare earth element ion transferred energy to Ce, or emitted light by itself, so that it may increase the optical volume generated from YAG:Ce phosphor. On the other hand, the green phosphor according to Comparative Example 2 exhibited lower brightness than that of Comparative Example 1, so that the decay time was remarkably prolonged. From the results, it may be understood that the phosphors according to Examples 1 to 6 were better for the phosphor for a PDP for realizing a three-dimensional stereoscopic image.

The phosphors according to Examples 1 to 3 and Comparative Example 1 were measured for the fluorescent spectrum (exciting wavelength: 147 nm). The results are shown in FIG. 2.

Figure 2:
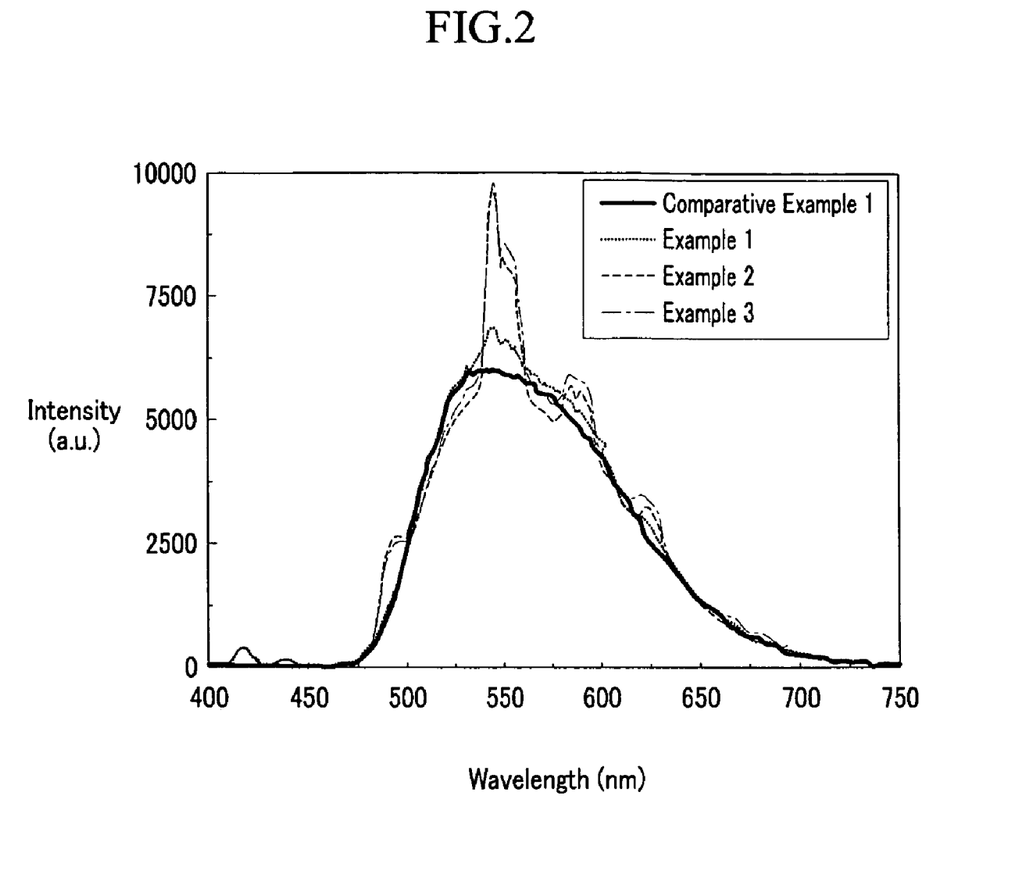
FIG. 2 illustrates a graph showing fluorescent spectra of phosphors according to Examples 1 to 3 and Comparative Example 1.
Figure 3:
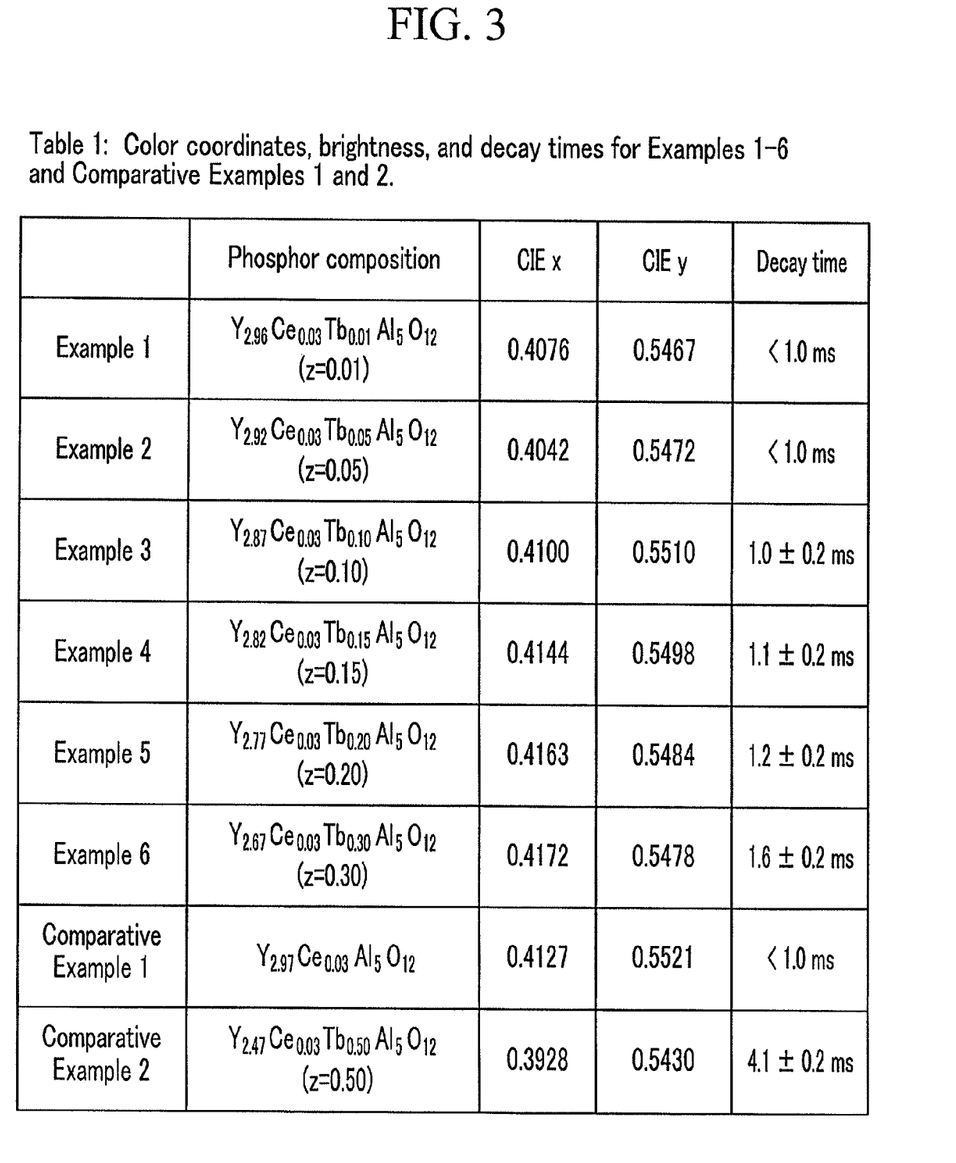
FIG. 3 illustrates Table 1, showing color coordinates, brightness, and decay times for Examples 1-6 and Comparative Examples 1 and 2.

FIG. 2 illustrates a graph showing the results of the fluorescent spectrum of phosphors according to Examples 1 to 3 and Comparative Example 1.

As shown in FIG. 2, as the phosphors according to Examples 1 to 3 increased the brightness of light emitted around 470 to 580 nm, and a short decay time was maintained. Therefore, they may effectively be used in a PDP for realizing a three-dimensional stereoscopic image.

EXAMPLE 7

Figure 4:
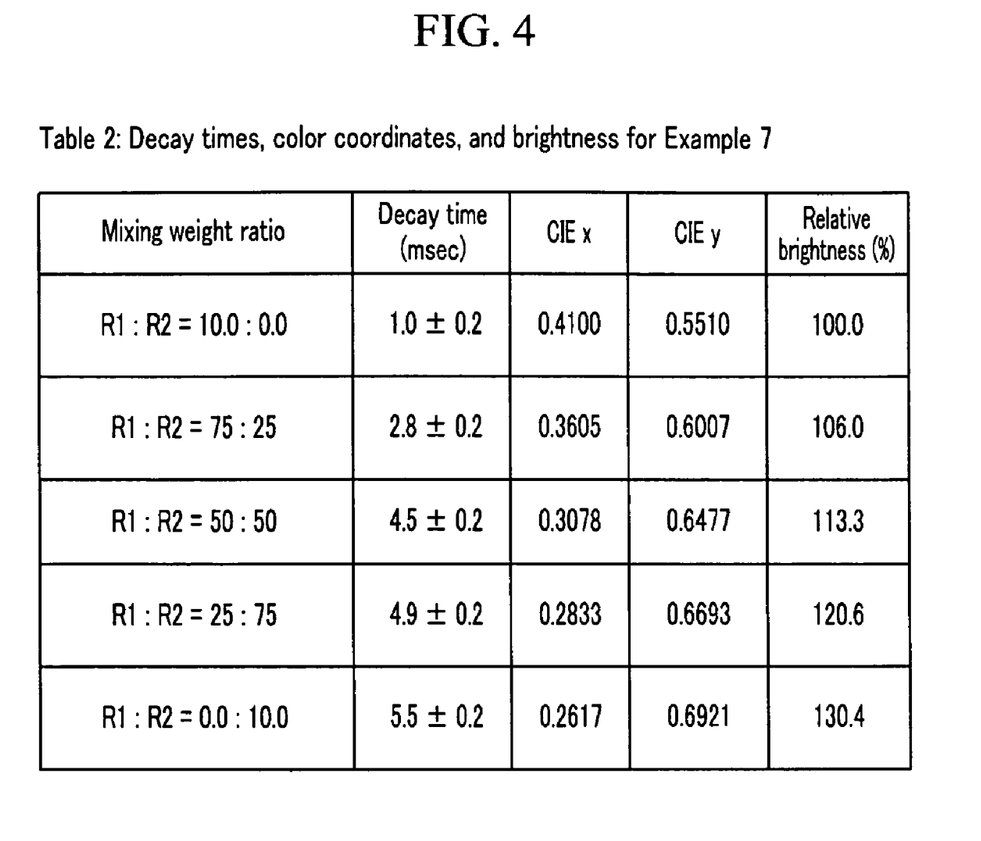
FIG. 4 illustrates Table 2, showing decay times, color coordinates, and brightness for Example 7.

A first phosphor R1 of $Y_{2.87}Ce_{0.03}Tb_{0.10}Al_5O_{12}$ obtained from Example 3 was mixed with a second phosphor R2 of $Zn_{1.8}Mn_{0.2}SiO_4$ in the mixing ratio as shown in Table 2 in FIG. 4 to provide a phosphor composition.

The second phosphor was provided by weighting the raw materials of $SiO_2$ and $MnCO_3$ in accordance with a chemical equivalent, and weighting ZnO at 110% of the chemical equivalent due to its high temperature volatility. The components were then mixed and then fired at 1300° C., under a 5% hydrogen-95% nitrogen atmosphere for 2 hours. Then, the mixture was pulverized, washed, dried, and sieved to provide a fired mixture.

The phosphor composition was measured for decay time, color coordinate, and relative brightness in accordance with the same procedure as above, and the results are shown in Table 2.

The relative brightness is the relative value compared to the brightness of a phosphor using only $Y_{2.87}Ce_{0.03}Tb_{0.10}Al_5O_{12}$, as in Example 3. The brightness of $Y_{2.87}Ce_{0.03}Tb_{0.10}Al_5O_{12}$ was considered to be 100%.

EXAMPLE 8

Figure 5:
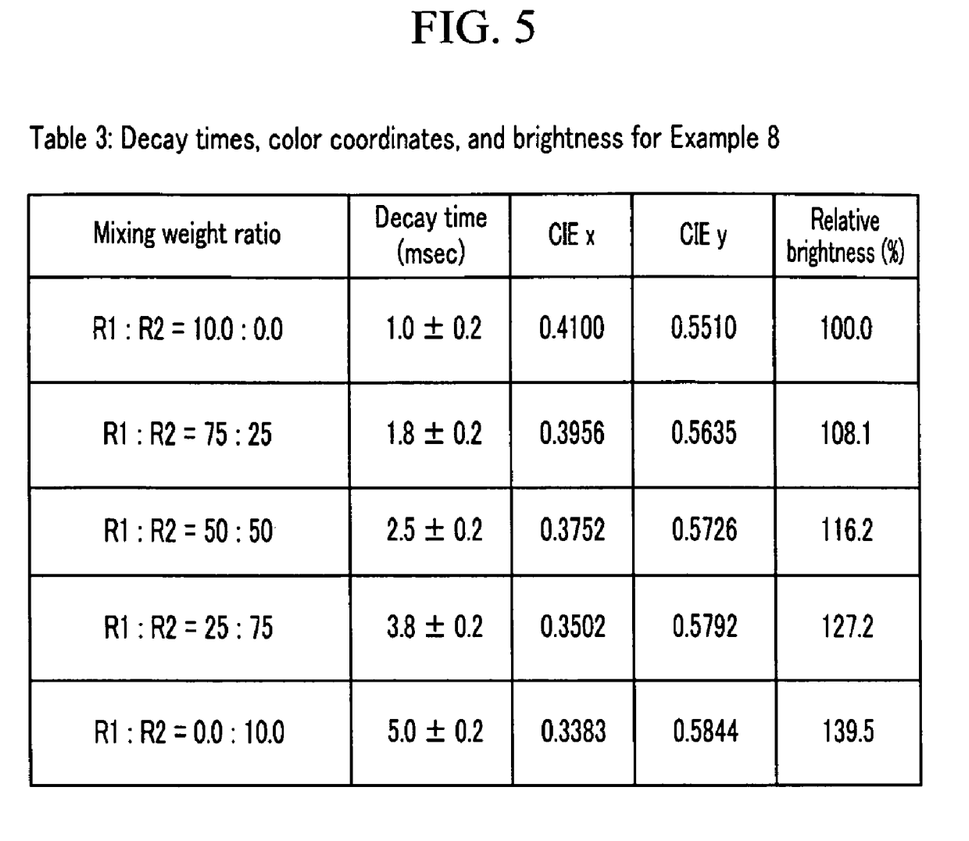
FIG. 5 illustrates Table 3, showing decay times, color coordinates, and brightness for Example 8.

A first phosphor R1 of $Y_{2.87}Ce_{0.03}Tb_{0.10}Al_5O_{12}$ obtained from Example 3 was mixed with a second phosphor R2 of $(Y,Gd)_{0.75}Tb_{0.25}Al_3(BO_3)_4$ in various mixing ratios as shown in Table 3 in FIG. 5 to provide a phosphor composition.

The second phosphor was provided by weighting the raw materials of $Y_2O_3$, $Gd_2O_3$, $Al_2O_3$, and $Tb_4O_7$ in accordance with a chemical equivalent and weighting $B_2O_3$ at 110% of a stoichiometric ratio as a flux, then mixing them. 100 g of the mixed raw material were introduced into a 300 cc alumina crucible and fired under an oxygen atmosphere at 1200° C. for 2 hours. The fired mixture was pulverized, washed, dried, and sieved to provide a $(Y,Gd)_{0.75}Tb_{0.25}Al_3(BO_3)_4$ phosphor.

The phosphor composition was measured for decay time, color coordinate, and relative brightness in accordance with the same procedure as above, and the results are shown in Table 3:

The relative brightness was determined by comparing to brightness of a phosphor composition using only $Y_{2.87}Ce_{0.03}Tb_{0.10}Al_5O_{12}$, as in Example 3. The brightness of $Y_{2.87}Ce_{0.03}Tb_{0.10}Al_5O_{12}$ was considered to be 100%.

As shown in Tables 2 and 3, phosphor compositions according to Examples 7 and 8 in which a $Y_{2.87}Ce_{0.03}Tb_{0.10}Al_5O_{12}$ phosphor, having a short decay time, was mixed with $Zn_{1.8}Mn_{0.2}SiO_4$ or $(Y,Gd)Al_3(BO_3)_4$:Tb, having an excellent green brightness characteristic, at a suitable ratio showed excellent brightness characteristics and color coordinate characteristics, and the decay times were suitable for realizing a stereoscopic image.

As a result, the phosphor composition according to an embodiment may have excellent brightness characteristics, particularly color coordinate characteristics. The phosphor composition may improve image driving, when compared to that of the conventional phosphor, when it is used in a PDP for displaying a stereoscopic image.

A green phosphor having a short decay time and good brightness may be useful for the next generation virtual three-dimensional stereoscopic multimedia, which may be applied to fields of, e.g., telecommunications, broadcasting, medical, education, training, military, games, animation, virtual reality, CAD, industrial technology, and so on.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A phosphor composition for a display device, comprising:
a first phosphor represented by Formula 1:

$$Y_{3-x-k-z}Ce_kM_zM'_xAl_{a-y}M''_yO_{(1.5a+4.5)} \quad (1)$$

wherein, M includes at least one of Tb, Dy, and Eu, M' includes at least one of Sc, Gd, In, and La, M" includes at least one of Ga, Sc, and In, and x, y, z, k, and a represent molar ratios and satisfy the relations: $0.0 \leq x < 3.0$, $0.0 \leq y \leq 7.0$, $0.0 < k < 0.1$, $0.0 < z < 0.5$, $4.0 \leq a \leq 7.0$, $a-y \geq 0.0$, $x+k+z \leq 3.0$, and $0.01 \leq z/k \leq 20$; and a second phosphor including at least one phosphor represented by the following Formulae 2 to 9:

$$Zn_{2-p}Mn_pSiO_4 \quad (2)$$

wherein p satisfies the relation: $0.01 \leq p \leq 0.60$, $$YBO_3:Tb \quad (3)$$

$$(Y,Gd)_{1-q}Tb_qAl_3(BO_3)_4 \quad (4)$$

wherein q satisfies the relation: $0.01 \leq q < 0.50$, $$BaMgAl_{10}O_{17}:Mn \quad (5)$$

$$BaMgAl_{12}O_{19}:Mn \quad (6)$$

$$Zn(Ga_{1-r}Al_r)_2O4:Mn \quad (7)$$

wherein r satisfies the relation: $0 \leq r \leq 1$, $$Li_2Zn(Ge, \theta)_vO_8:Mn \quad (8)$$

wherein θ includes Al or Ga, and v satisfies the relation: $3 \leq v \leq 4$, $$(Y_{3-w}Ce_w)Al_5O_{12} \quad (9)$$

wherein w satisfies the relation: $0 \leq w \leq 3$.

2. The phosphor composition as claimed in claim 1, wherein, z satisfies the relation: $0.0 < z < 0.2$.

3. The phosphor composition as claimed in claim 1, wherein the phosphor represented by Formula 1 has a decay time of about 5.0 ms or less.

4. The phosphor composition as claimed in claim 1, wherein the phosphor has a CIE x color coordinate of about 0.38 to about 0.42 and a CIE y color coordinate of about 0.53 to about 0.56.

5. The phosphor composition as claimed in claim 1, wherein a weight ratio of the first phosphor and the second phosphor is about 90:10 to about 30:70.

6. A display device, comprising:
a display unit including a phosphor composition including:
a first phosphor represented by Formula 1:

$$Y_{3-x-k-z}Ce_kM_zM'_xAl_{a-y}M''_yO_{(1.5a+4.5)}$$

wherein, M includes at least one of Tb, Dy, and Eu, M' includes at least one of Sc, Gd, In, and La, M" includes at least one of Ga, Sc, and In, x, y, z, k, and a represent molar ratios and satisfy the relations: $0.0 \leq x < 3.0$, $0.0 \leq y \leq 7.0$, $0.0 < k < 0.1$, $0.0 < z < 0.5$, $4.0 \leq a \leq 7.0$, $a-y \geq 0.0$, $x+k+z \leq 3.0$, and $0.01 \leq z/k \leq 20$, and a second phosphor including at least one phosphor represented by the following Formulae 2 to 9:

$$Zn_{2-p}Mn_pSiO_4 \quad (2)$$

wherein p satisfies the relation: $0.01 \leq p \leq 0.60$, $$YBO_3:Tb \quad (3)$$

$$(Y,Gd)_{1-q}Tb_qAl_3(BO_3)_4 \quad (4)$$

wherein q satisfies the relation: $0.01 \leq q < 0.50$, $$BaMgAl_{10}O_{17}:Mn \quad (5)$$

$$BaMgAl_{12}O_{19}:Mn \quad (6)$$

$$Zn(Ga_{1-r}Al_r)_2O4:Mn \quad (7)$$

wherein r satisfies the relation: $0 \leq r \leq 1$, $$Li_2Zn(Ge, \theta)_vO_8:Mn \quad (8)$$

wherein θ includes Al or Ga, and v satisfies the relation: $3 \leq v \leq 4$, $$(Y_{3-w}Ce_w)Al_5O_{12} \quad (9)$$

wherein w satisfies the relation: $0 \leq w \leq 3$.

7. The display device as claimed in claim 6, wherein z satisfies the relation: $0.0 < z < 0.2$.

8. The display device as claimed in claim 6, wherein the phosphor of Formula 1 has a decay time of about 5.0 ms or less.

9. The display device as claimed in claim 6, wherein the phosphor has a CIE x color coordinate of about 0.38 to about 0.42 and a CIE y color coordinate of about 0.53 to about 0.56.

10. The display device as claimed in claim 6, wherein a weight ratio of the first phosphor and the second phosphor is about 90:10 to about 30:70.

11. The display device as claimed in claim 6, wherein the display device includes a device for realizing a three-dimensional stereoscopic image.

12. The display device as claimed in claim 6, wherein the display device is driven at speed of about 120 Hz or more.

13. A display device, comprising:
a display unit including a phosphor composition including a phosphor represented by Formula 1:

$$Y_{3-x-k-z}Ce_kM_zM'_xAl_{a-y}M''_yO_{(1.5a+4.5)}$$

wherein, M includes at least one of Tb, Dy, and Eu, M' includes at least one of Sc, Gd, In, and La, M" includes at least one of Ga, Sc, and In, x, y, z, k, and a represent molar ratios and satisfy the relations: $0.0 < x < 3.0$, $0.0 < y < 7.0$, $0.0 < k < 0.1$, $0.0 < z < 0.5$, $4.0 < a < 7.0$, $a-y > 0.0$, $x+k+z < 3.0$, and $0.01 < z/k < 20$, and wherein the display device includes a device for realizing a three-dimensional stereoscopic image.

* * * * *